United States Patent
Yang et al.

(10) Patent No.: US 7,054,170 B2
(45) Date of Patent: May 30, 2006

(54) POWER-MODE CONTROLLED POWER CONVERTER

(75) Inventors: Ta-yung Yang, Milpitas, CA (US);
Chern-Lin Chen, Taipei (TW);
Jenn-yu G. Lin, Taipei (TW);
Guo-Kiang Hung, Sindian (TW)

(73) Assignee: System General Corp., Taipei Hsien (TW)

( * ) Notice: Subject to any disclaimer, the term of this patent is extended or adjusted under 35 U.S.C. 154(b) by 0 days.

(21) Appl. No.: 10/752,363

(22) Filed: Jan. 5, 2004

(65) Prior Publication Data
US 2005/0146903 A1 Jul. 7, 2005

(51) Int. Cl.
*H02M 3/335* (2006.01)
(52) U.S. Cl. ............... 363/21.18; 363/21.13; 363/21.16
(58) Field of Classification Search ............. 363/21.18, 363/21.13, 21.16, 21.12
See application file for complete search history.

(56) References Cited

U.S. PATENT DOCUMENTS

| | | | | |
|---|---|---|---|---|
| 5,734,564 A | * | 3/1998 | Brkovic | 363/21.16 |
| 5,812,383 A | * | 9/1998 | Majid et al. | 363/21.05 |
| 5,982,640 A | * | 11/1999 | Naveed et al. | 363/21.15 |
| 5,995,384 A | * | 11/1999 | Majid et al. | 363/21.18 |
| 5,999,421 A | * | 12/1999 | Liu | 363/21.15 |
| 6,125,046 A | * | 9/2000 | Jang et al. | 363/21.15 |
| 6,529,391 B1 | * | 3/2003 | Yoshinaga et al. | 363/21.15 |
| 6,836,415 B1 | * | 12/2004 | Yang et al. | 363/21.01 |
| 6,853,563 B1 | * | 2/2005 | Yang et al. | 363/21.15 |

* cited by examiner

Primary Examiner—Shawn Riley
(74) Attorney, Agent, or Firm—J.C. Patents

(57) ABSTRACT

A power-mode controlled power converter is capable of supplying a constant output voltage and output current. A PWM controller generates a PWM signal in response to a voltage sampled from a transformer auxiliary winding. A programmable current-sink and a detection resistor compensate for a voltage drop of an output rectifier. A low-pass filter integrates a switching-current voltage to an average-current signal. An attenuator produces an input-voltage signal from a line-voltage input signal. The PWM controller multiplies the average-current signal with the input-voltage signal to generate a power-control signal. An error-amplifier compares the power-control signal with a power-reference voltage to generate a limit voltage. The limit voltage controls the power delivered from a primary-side circuit to a secondary-side circuit of the power-mode controlled power converter. Since the power-reference voltage varies in proportional to output voltage variations, a constant output current is therefore achieved.

14 Claims, 12 Drawing Sheets

POWER-MODE CONTROLLED POWER CONVERTER

BACKGROUND OF THE INVENTION

1. Field of the Invention

The present invention relates to a power converter and more specifically relates to a primary-side controlled power converter.

2. Description of Related Art

Various modes of control for power converters have been widely used to regulate an output voltage and an output current. Two common modes for such regulation are voltage-mode and current-mode.

FIG. 1 shows a traditional power converter. An error amplifier 12 and an error amplifier 13 are utilized to produce a feedback signal from the output current and the output voltage. The feedback signal will be provided to a PWM controller 11 in the primary-side circuit via an optical-coupler 14. The PWM controller 11 generates a PWM signal to switch a transformer 51 by switching a transistor 70. A switching current flowing through the transistor 70 is converted to a detection voltage signal via a resistor 20. The PWM controller 11 compares the feedback signal with the detection voltage signal to produce a PWM signal. The PWM signal will regulate the output voltage and/or the output current. However, the optical-coupler and other secondary-side control circuitry add significantly to the size and device count of the power converter. This is a main drawback of this power converter.

FIG. 2 shows the schematic circuit of a primary-side controlled power converter. The primary-side controlled power converter includes a PWM controller 12. A reflected-voltage from an auxiliary winding $N_A$ of a transformer 50 is supplied to the PWM controller 12 via a resistor 61. This is used to provide the feedback signal for output voltage control. Since the reflected-voltage produced by the auxiliary winding $N_A$ is strongly correlated with an output voltage provided by a secondary winding $N_S$, the PWM controller 12 can regulate the output voltage from the primary-side of the transformer 50.

To regulate the output current from the primary-side of the transformer 50, it is necessary to control the power delivered from the primary-side to the secondary-side of the transformer 50. The relationship between an output power $P_O$ and a switching current $I_{IN}$ of the power converter can be expressed as:

$$P_O = V_O \times I_O = \eta \times P_{IN} = \eta \times I_{IN} \times V_{IN} \quad (1)$$

$$I_{IN} = \left[\left(\frac{V_{IN}}{L_P} \times \frac{T_{ON}}{2T}\right) + \left(I_A \times \frac{T_{ON}}{T}\right)\right] \quad (2)$$

Where $V_O$ is the output voltage; $I_O$ is the output current; $\eta$ is the efficiency; $I_A$ is the reflected load current; $L_P$ is the primary magnetized inductance; T is the switching period; and $T_{ON}$ is the on-time of the switching signal.

In order to control the output voltage $V_O$, the on-time $T_{ON}$ of the switching signal is adjusted in response to the feedback signal. When the output current $I_O$ increases, a switching current of the transistor will also increase. The switching current of the transistor 70 will be converted to a switching-voltage. When the switching-voltage exceeds a maximum threshold voltage $V_{LIMIT}$, the on-time $T_{ON}$ of the switching signal will be restricted to regulate the output current $I_O$. The maximum input power $P_{IN\_MAX}$ can be expressed as:

$$P_{IN\_MAX} = \left[\frac{1}{2 \times T} \times L_P \times \left(\frac{V_{LIMIT}}{R_S}\right)^2\right] \quad (3)$$

The equations (1) and (3) can then be rewritten as:

$$I_O = \frac{P_O}{V_O} = \frac{\eta \times P_{IN\_MAX}}{V_O} = \left\{\frac{\eta \times \left[\frac{1}{2 \times T} \times L_P \times \left(\frac{V_{LIMIT}}{R_S}\right)^2\right]}{V_O}\right\} \quad (4)$$

Because the maximum input power $P_{IN\_MAX}$ is limited, the output voltage $V_O$ will decrease whenever the output current $I_O$ increases. The output voltage deviation and the output current variation (the slope of the V/I curve) determine the constant current output performance. FIG. 3 provides an illustration of this.

Referring to equation (4), when the output voltage $V_O$ decreases, a constant output current $I_O$ can be achieved by increasing the switching period T and/or reducing the voltage signal $V_{LIMIT}$. However, any of several factors can skew the accuracy of this method. Deviation in the primary magnetized inductance $L_P$ and a drifting switching frequency (1/T) can cause the maximum input power limit $P_{IN\_MAX}$ and the output current $I_O$ to fluctuate.

Furthermore, the propagation delay time $T_D$ affects the precision of the output current $I_O$. Referring to FIG. 2, a resistor 20 is used to convert the switching current $I_{IN}$ to a switching-current voltage $V_{IDET}$. As shown in FIG. 4, a voltage $V_{IA}$ can be expressed as:

$$V_{IA} = I_A \times R_S$$

Where $I_A$ is the reflected load current; $R_S$ is the resistance of the resistor 20.

The switching-current voltage $V_{IDET}$ exceeds the threshold voltage $V_{LIMIT}$ at the time $T_{ONX}$. However, $V_{PWM}$ is not turned off until after a propagation delay time $T_D$. During this propagation delay time $T_D$, the switching current $I_{IN}$ continues to increase. This will generate an extra input current $I_{IN-ex}$.

The amplitude of the current $I_{IN-ex}$ can be calculated according to equation (5). Referring to equation (6), the extra input current $I_{IN-ex}$ will cause the maximum input power $P_{IN-MAX}$ and the output current $I_O$ to increase in response to an increasing input voltage $V_{IN}$.

$$I_{IN-ex} = \left\{\left(\frac{V_{IN}}{L_P} \times \frac{T_D}{2T}\right) + \left[\left(\frac{V_{IN}}{L_P} \times T_{ONX}\right) + I_A\right] \times \frac{T_D}{T}\right\} \quad (5)$$

$$P_{IN\_MAX} = \left[\frac{1}{2 \times T} \times L_P \times \left(\frac{V_{LIMIT}}{R_S} + I_{IN-ex}\right)^2\right] \quad (6)$$

According to foregoing description, we can find that the primary-side control of the prior art is not accurate and is not fit for the mass production of the power converter.

The object of the present invention is to provide a primary-side controlled power converter that can precisely regulate the output voltage and generate a constant output current.

SUMMARY OF THE INVENTION

A power-mode controlled power converter according to the present invention comprises a transformer, a power transistor, a line resistor, an auxiliary rectifier, a decouple capacitor, a detection resistor, a sense resistor, an output rectifier, and an output capacitor, an integrate-capacitor, and a PWM controller.

The PWM controller of the power-mode controlled power converter has a supply terminal, a voltage-detection terminal, an output terminal, a current-detection terminal, a filter terminal, a line-voltage input terminal and a ground terminal.

The line resistor is connected from an input of the power-mode controlled power converter to the line-voltage input terminal to start up the PWM controller and provide input-voltage detection after the PWM controller is started up. The auxiliary rectifier connected from an auxiliary winding of the transformer to the decouple capacitor further provides DC power to the PWM controller when the PWM controller starts to operate.

The sense resistor is connected to the power transistor and the current-detection terminal of the PWM controller for providing a switching-current voltage. The integrate-capacitor connected to the filter terminal of the PWM controller forms a low-pass filter and integrates the switching-current voltage to an average-current signal. The PWM controller uses the average-current signal and a line-voltage input signal for output current regulation.

The PWM controller of the power-mode controlled power converter further includes a sample-hold circuit for sampling the voltage at the voltage-detection terminal and producing a sample-voltage. A first error amplifier compares the sample-voltage with a reference voltage to generate a feedback voltage. A first comparator compares the feedback voltage with the switching-current voltage to produce a voltage-reset signal. A programmable current-sink connected to the voltage-detection terminal generates a programmable current in response to the feedback voltage. The programmable current and the detection resistor produce an offset-voltage to compensate for the voltage drop across the output rectifier. The PWM controller also includes an attenuator to attenuate the line-voltage input signal to an input-voltage signal. A multiplier multiplies the average-current signal with the input-voltage signal to generate a power-control signal. A second error amplifier compares the power-control signal with a power-reference voltage, which is generated by a reference-voltage generator, to generate a limit voltage. A second comparator compares the limit voltage with the switching-current voltage to produce a current-reset signal.

The PWM controller further comprises an oscillator and a SR flip-flop to generate a PWM signal. The SR flip-flop is periodically set by an output of the oscillator and reset by both the current-reset signal and the voltage-reset signal. A blanking circuit produces a blanking time to ensure that the minimum on-time of the PWM signal, which creates a sufficient delay to precisely generate the sample-voltage. A filter resistor connected in between the current-detection terminal and the filter terminal provides high impedance for the low-pass filter. The PWM controller further includes a first switch and a second switch. The first switch is connected from the line-voltage input terminal to the supply terminal. The second switch is connected from the line-voltage input terminal to the attenuator. The first switch is turned off and the second switch is turned on once the PWM controller starts to operate.

It is to be understood that both the foregoing general descriptions and the following detailed descriptions are exemplary, and are intended to provide further explanation of the invention as claimed. Still further objects and advantages will become apparent from a consideration of the ensuing description and drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
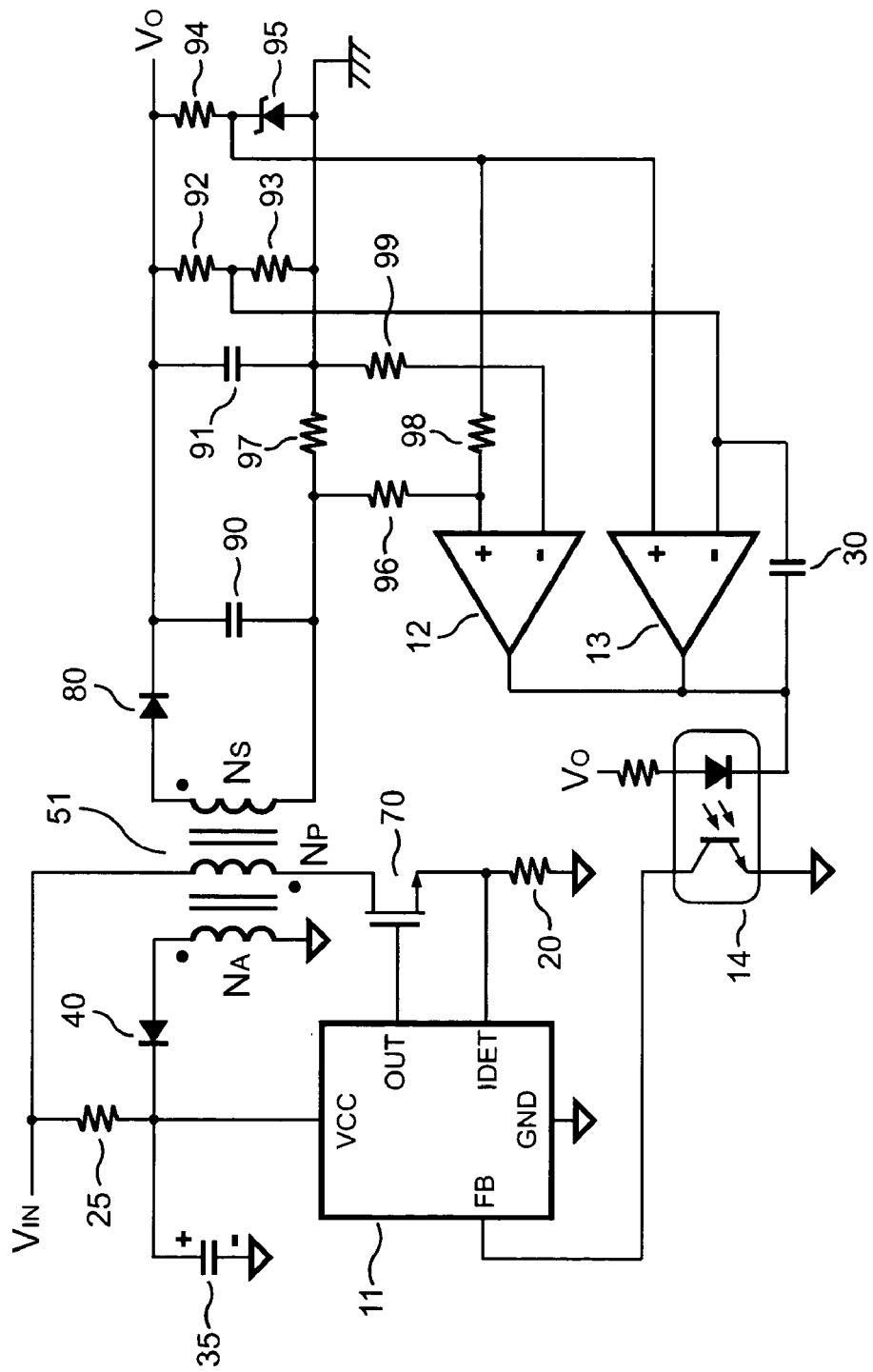
FIG. 1 shows a traditional power converter.
Figure 2:
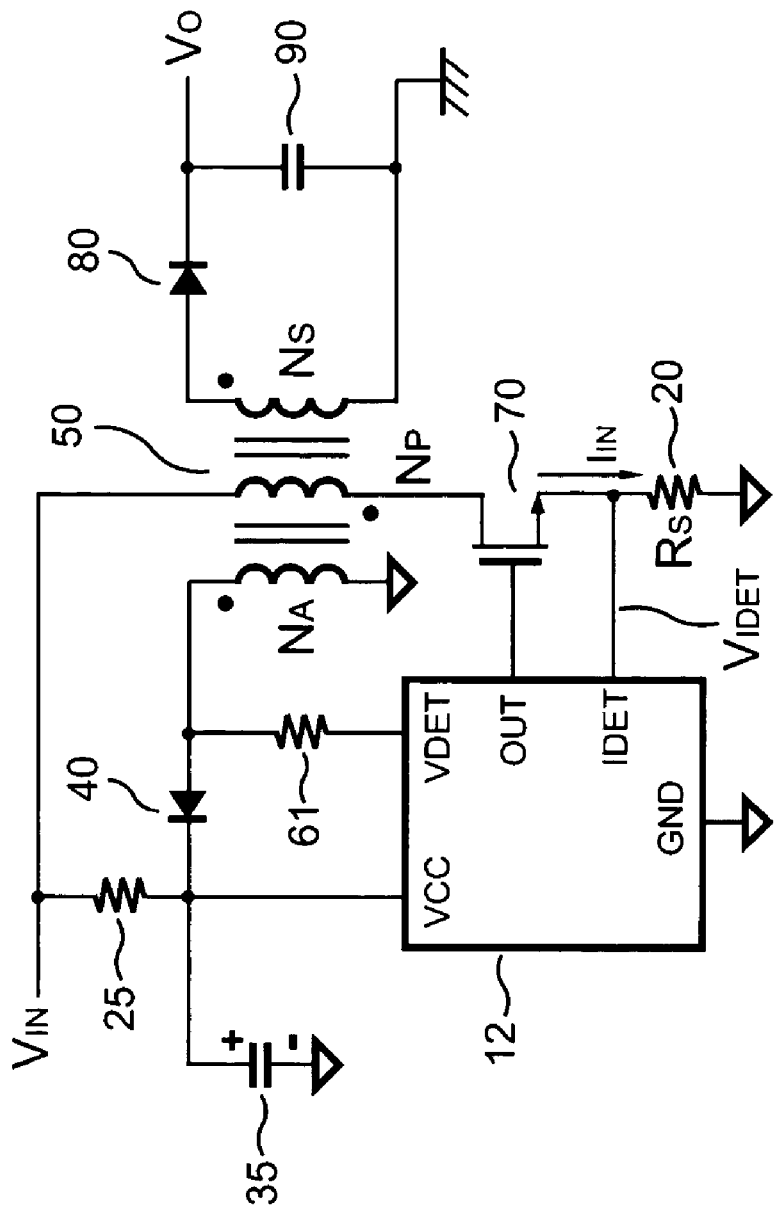
FIG. 2 shows the schematic circuit of a primary-side controlled power converter.
Figure 3:
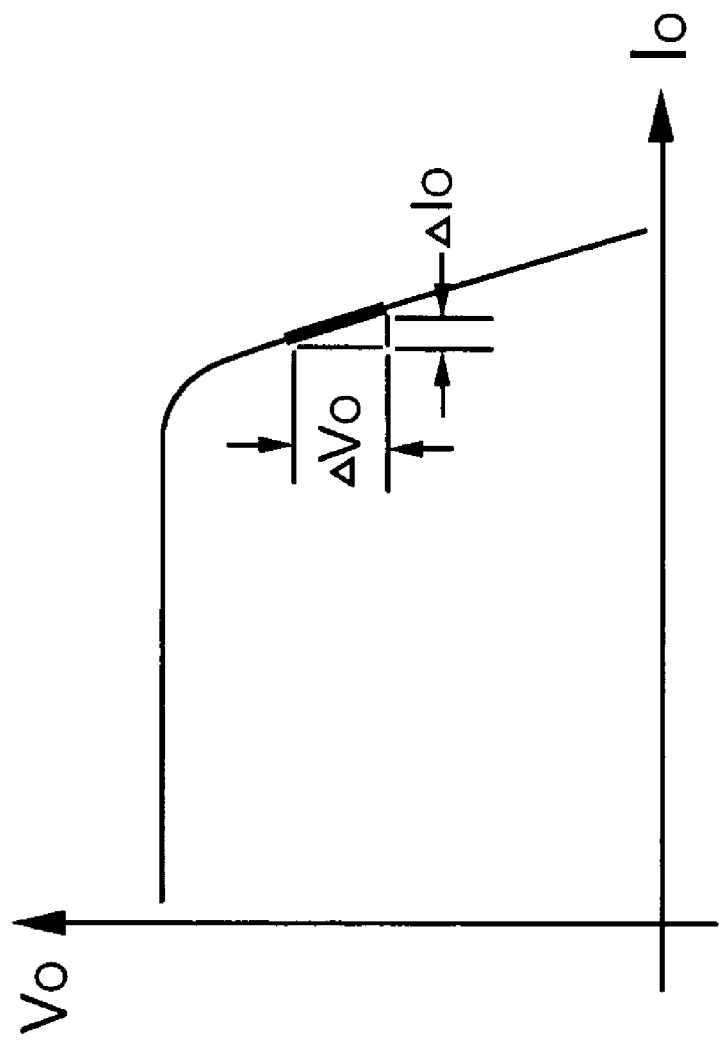
FIG. 3 shows a common V/I curve for power converters.
Figure 4:
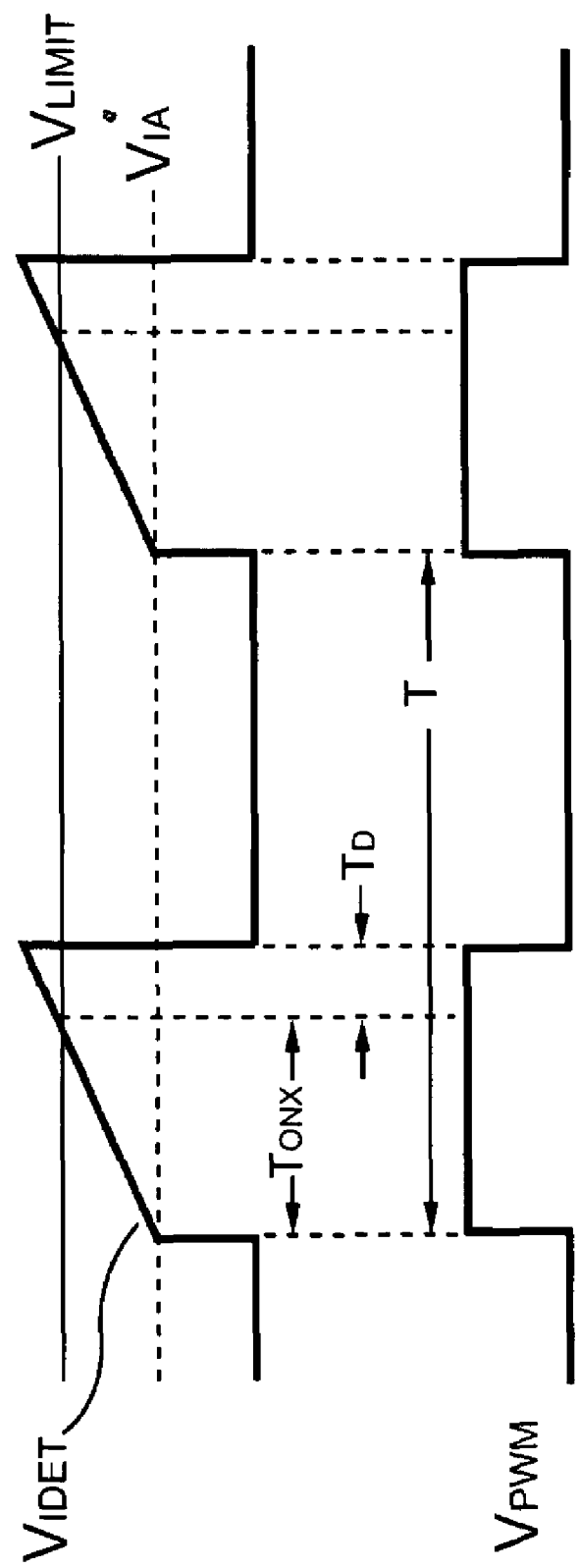
FIG. 4 shows the waveform of a PWM signal having a propagation delay.
Figure 5:
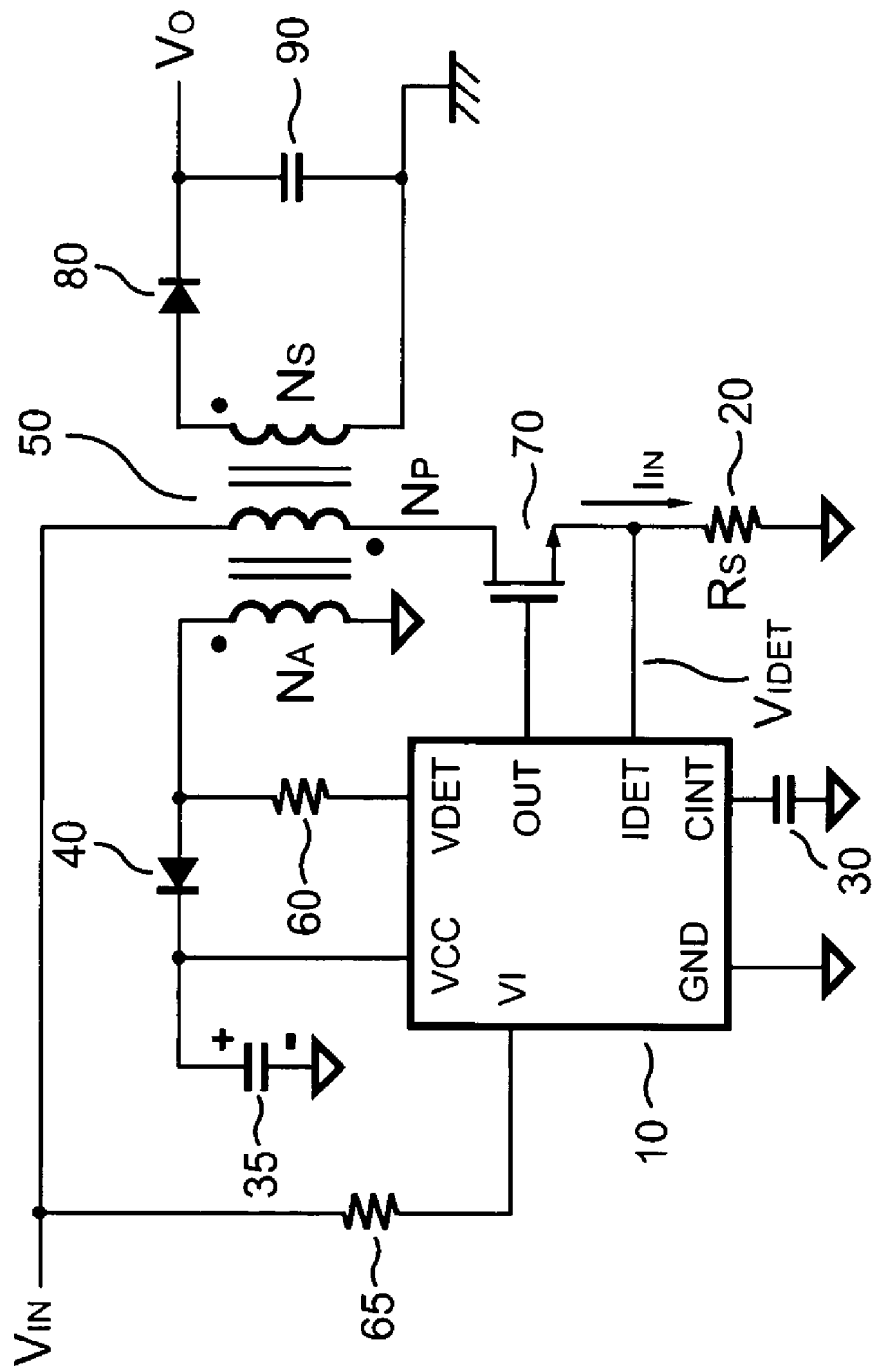
FIG. 5 shows the schematic circuit of a power-mode controlled power converter according to the present invention.

FIG. 5 shows a power-mode controlled power converter according to the present invention. The power-mode controlled power converter according to the present invention includes a PWM controller 10 having a supply terminal VCC, a voltage-detection terminal VDET, a line-voltage input terminal VI, a filter terminal CINT, a current-detection terminal IDET, an output terminal OUT, and a ground terminal GND. The power-mode controlled power converter according to the present invention also includes a line resistor 65, a decouple capacitor 35, an auxiliary rectifier 40, a detection resistor 60, an integrate-capacitor 30, a sense resistor 20, a power transistor 70, an output rectifier 80, and an output capacitor 90. The power-mode controlled power converter of the present invention further includes a transformer 50 having an auxiliary winding $N_A$, a primary winding $N_P$, and a secondary winding $N_S$.

A first terminal of the line resistor 65 is supplied with an input voltage $V_{IN}$ of the power converter. A second terminal of the line resistor 65 is connected to the line-voltage input terminal VI of the PWM controller 10. A positive end of the auxiliary winding $N_A$ is connected to an anode of the auxiliary rectifier 40. A cathode of the auxiliary rectifier 40 is connected to the decouple capacitor 35. The supply terminal VCC of the PWM controller 10 is connected to the cathode of the auxiliary rectifier 40. The detection resistor 60 is connected between the anode of the auxiliary rectifier 40 and the voltage-detection terminal VDET of the PWM controller 10. The output terminal OUT of the PWM controller 10 drives a gate of the power transistor 70. The sense resistor 20 is connected between a source of the power transistor 70 and a ground reference. The current-detection terminal IDET of the PWM controller 10 is connected to the source of the power transistor 70. The integrate-capacitor 30 is connected from the filter terminal CINT of the PWM controller 10 to the ground reference. The ground terminal GND of the PWM controller 10 is connected to the ground reference. An anode of the output rectifier 80 is connected to a positive end of the secondary winding $N_S$. The output capacitor 90 is connected between a cathode of the output rectifier 80 and a negative terminal of the secondary winding $N_S$. An output voltage $V_O$ of the power-mode controlled power converter is supplied from the cathode of the output rectifier 80.

Figure 6:
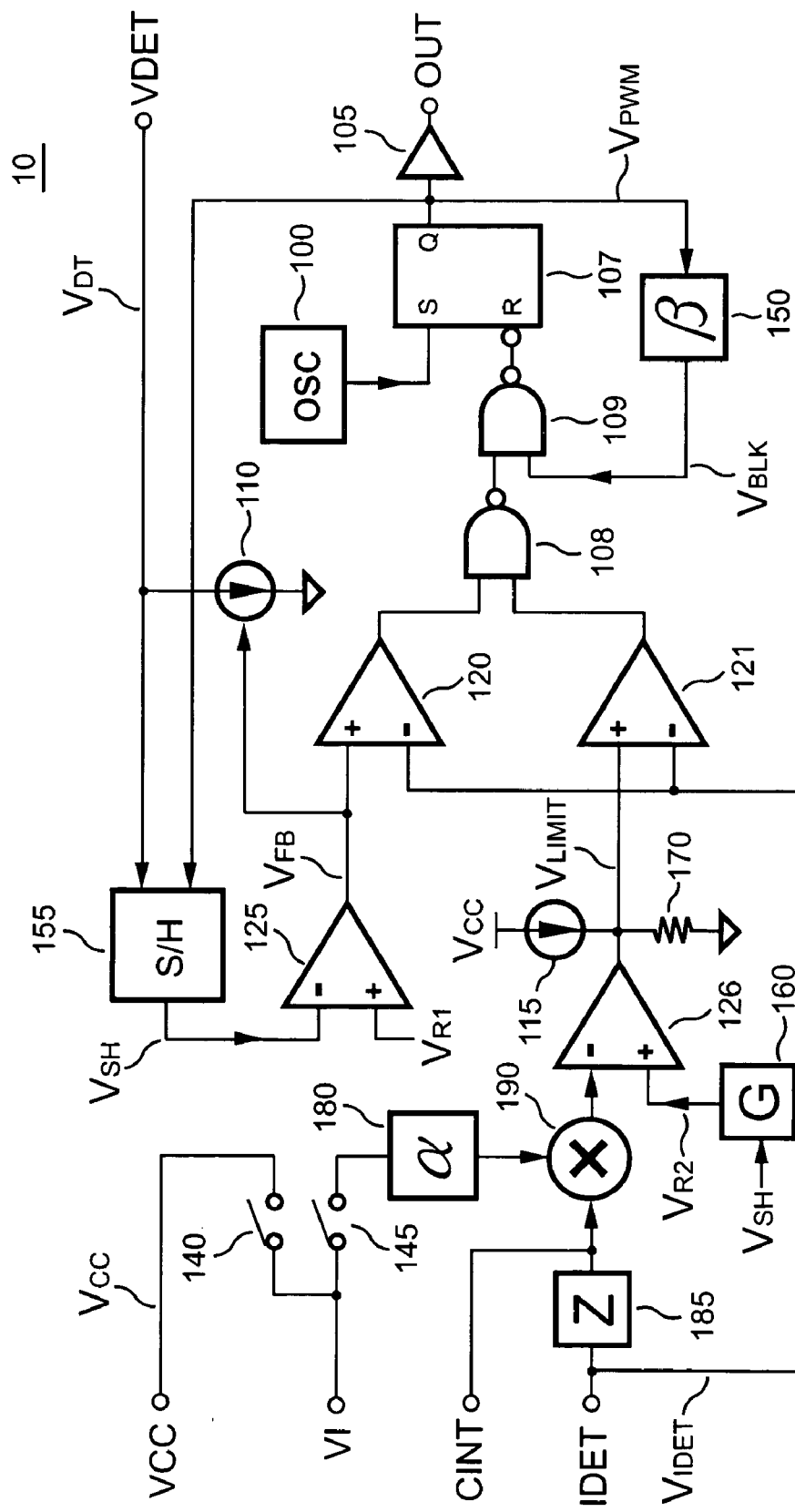
FIG. 6 shows a block diagram of a PWM-controller according to the present invention.

FIG. 6 shows the PWM controller 10 according to a preferred embodiment of the present invention. The PWM controller 10 includes a filter resistor 185, two switches 140 and 145, an attenuator 180, a multiplier 190, a sample-hold circuit 155, a reference-voltage generator 160, two error amplifiers 125 and 126, a current source 115, a resistor 170, two comparators 120 and 121, two NAND gates 108 and 109, an oscillator 100, a SR flip-flop 107, a blanking circuit 150, a programmable current-sink 110, and a buffer 105.

The switch 140 is connected between the supply terminal VCC and the line-voltage input terminal VI. The switch 145 is connected between the line-voltage input terminal VI and an input of the attenuator 180. Referring to FIG. 5 and FIG. 6, the switch 140 is turned on via the line resistor 65 to start up the PWM controller 10. After the PWM controller 10 starts up, the switch 140 will be turned off and the switch 145 will be turned on. To detect the line-voltage, a line-voltage input signal is then sent to the attenuator 180 via the switch 145.

The filter resistor 185 is connected between the current-detection terminal IDET and the filter terminal CINT. The filter resistor 185 is coupled with the integrate-capacitor 30 to supply an average-current signal to a first input of the multiplier 190. The multiplier 190 has a second input supplied with an input-voltage signal. The input-voltage signal is generated from an output of the attenuator 180. The multiplier 190 also has an output for supplying a power-control signal to a negative input of the error amplifier 126.

The sample-hold circuit 155 has a first input connected to the voltage-detection terminal VDET. The sample-hold circuit 155 further has an output for supplying a sample-voltage $V_{SH}$ to a negative input of the error amplifier 125. A positive input of the error amplifier 125 is supplied with a reference voltage $V_{R1}$. An input of the reference-voltage generator 160 is supplied with the sample-voltage $V_{SH}$. An output of the reference-voltage generator 160 supplies a power-reference voltage $V_{R2}$ to a positive input of the error amplifier 126. An output of the error amplifier 126 supplies a limit voltage $V_{LIMIT}$ to a positive input of the comparator 121.

An input terminal of the current source 115 is supplied with a supply voltage $V_{CC}$. An output terminal of the current source 115 is connected to the positive input of the comparator 121. The resistor 170 is connected from the output terminal of the current source 115 to the ground reference. Since the error amplifier 126 of the present invention is an open-drain device, the maximum value of the limit voltage $V_{LIMIT}$ is determined by the current source 115 and the resistance of the resistor 170.

A negative input of the comparator 120 and a negative input of the comparator 121 are connected to the current-detection terminal IDET to receive a switching-current voltage $V_{IDET}$. The switching-current voltage $V_{IDET}$ is converted from a switching current $I_{IN}$ of the power transistor 70 by the sense resistor 20. The error amplifier 125 compares the sample-voltage $V_{SH}$ and the reference voltage $V_{R1}$ to generate a feedback voltage $V_{FB}$ via an output of the error amplifier 125. The feedback voltage $V_{FB}$ is supplied to a positive input of the comparator 120 and a control terminal of the programmable current-sink 110.

The programmable current-sink 110 is connected between the first input of the sample-hold circuit 155 and the ground reference. The comparator 120 compares the feedback voltage $V_{FB}$ with the switching-current voltage $V_{IDET}$ to generate a voltage-reset signal. The voltage-reset signal is supplied to a first input of the NAND gate 108. The comparator 121 compares the limit voltage $V_{LIMIT}$ with the switching-current voltage $V_{IDET}$ to generate a current-reset signal. The current-reset signal is supplied to a second input of the NAND gate 108. An output of the NAND gate 108 is connected to a first input of the NAND gate 109. An output of the oscillator 100 sets the SR flip-flop 107. The SR flip-flop 107 is reset by an output of the NAND gate 109. An output of the SR flip-flop 107 supplies a PWM signal $V_{PWM}$ to a second input of the sample-hold circuit 155, an input of the buffer 105, and an input of the blanking circuit 150. An output of the blanking circuit 150 supplies a blanking signal $V_{BLK}$ to a second input of the NAND gate 109. The buffer 105 connected between the output of the SR flip-flop 107 and the output terminal OUT of the PWM controller 10 provides sufficient driving capability for the power transistor 70.

Figure 7:
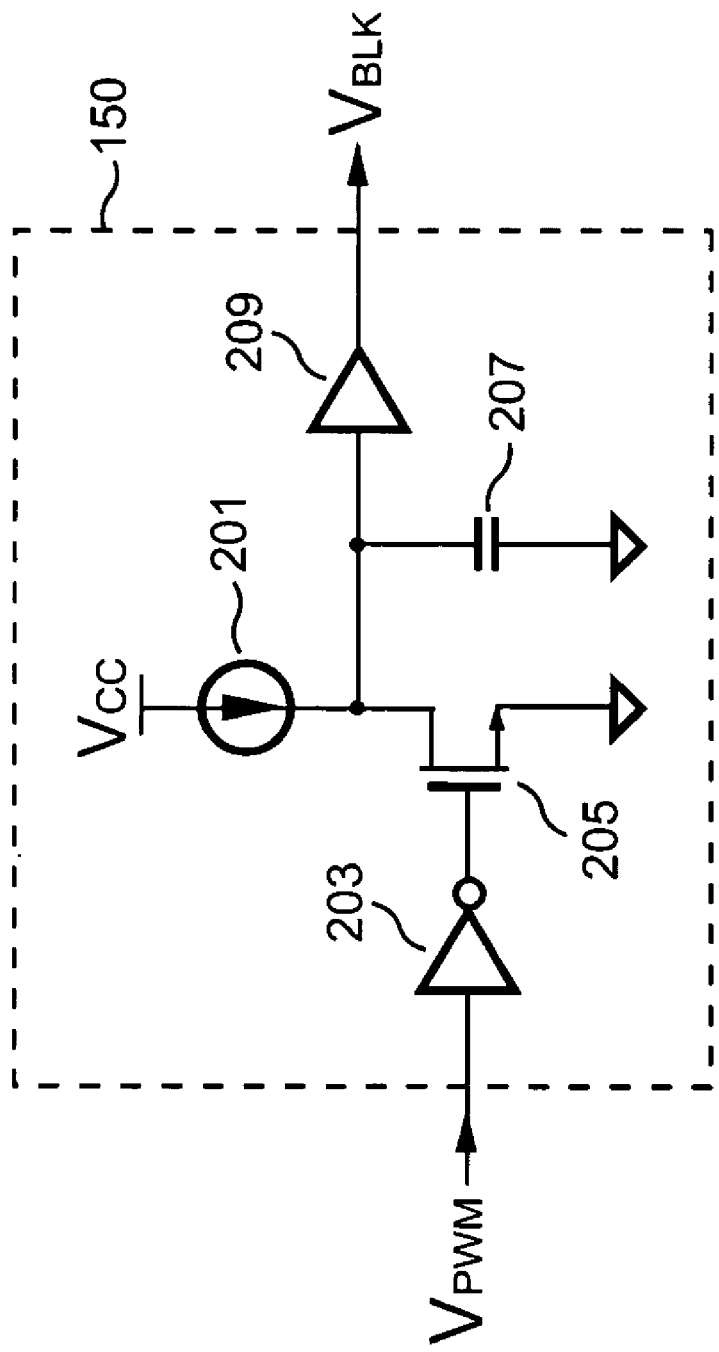
FIG. 7 shows a blanking circuit according to a preferred embodiment of the present invention.

FIG. 7 shows the blanking circuit 150 according to a preferred embodiment of the present invention. The blanking circuit 150 includes an inverter 203, a transistor 205, a current source 201, a capacitor 207, and a buffer 209. An input of the inverter 203 is supplied with the PWM signal $V_{PWM}$. An output of the inverter 203 is connected to a gate of the transistor 205. A source of the transistor 205 is connected to the ground reference. An input terminal of the current source 201 is supplied with the supply voltage $V_{CC}$. An output terminal of the current source 201 is connected to a drain of the transistor 205 and an input of the buffer 209. The capacitor 207 is connected between the drain of the transistor 205 and the ground reference. The blanking signal $V_{BLK}$ is generated from an output of the buffer 209.

As the PWM signal $V_{PWM}$ goes logic-high, the transistor 205 will be turned off. Therefore, the current source 201 will start to charge up the capacitor 207. Once the voltage across the capacitor 207 exceeds a logic-high threshold, the buffer 209 will output a logic-high blanking signal $V_{BLK}$. The current source 201 and the capacitor 207 are connected such that a blanking delay time is inserted after the PWM signal $V_{PWM}$ becomes logic-high, and before the blanking signal $V_{BLK}$ becomes logic-high.

Figure 8:
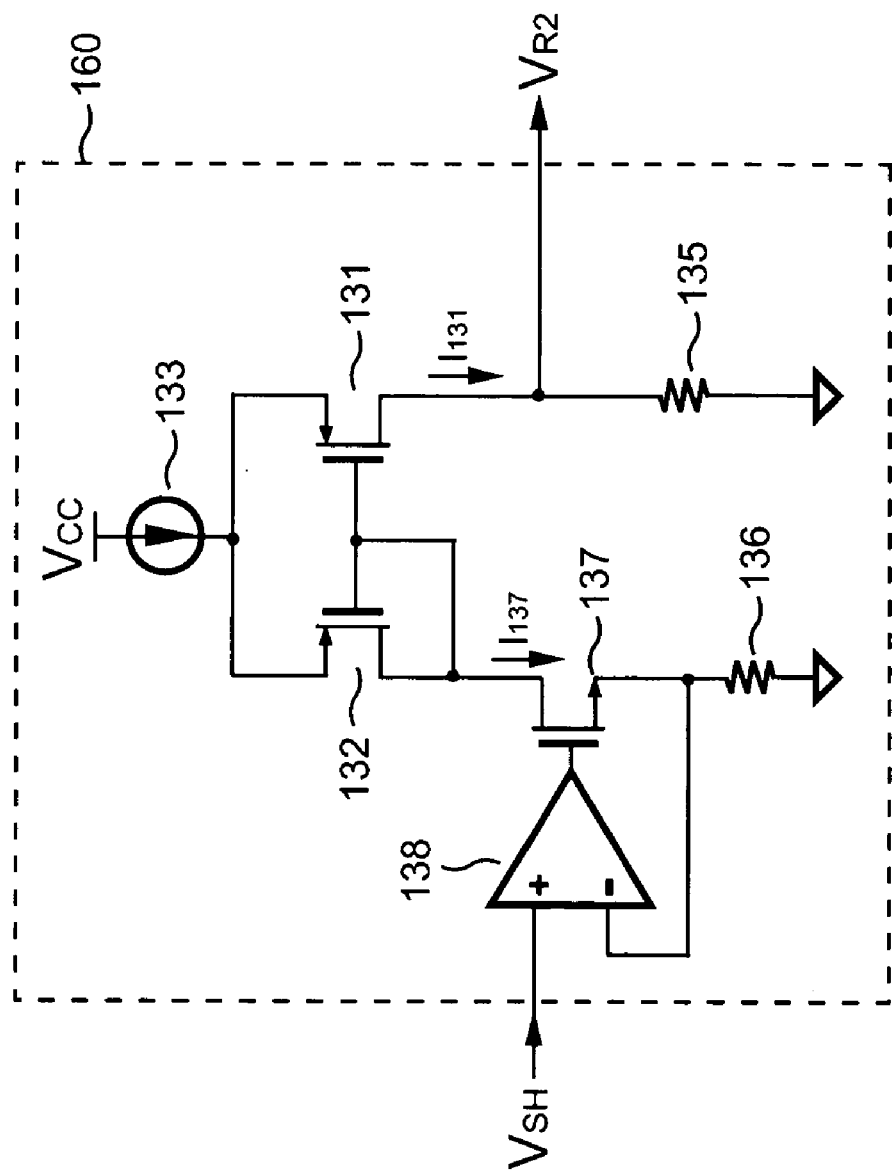
FIG. 8 shows a reference-voltage generator according to a preferred embodiment of the present invention.

FIG. 8 shows a preferred embodiment of the reference-voltage generator 160. The reference-voltage generator 160 includes an operation amplifier 138, three transistors 137, 132 and 131, a current source 133, and two resistors 136 and 135. A positive input of the operation amplifier 138 is supplied with the sample-voltage $V_{SH}$. An output terminal of the operation amplifier 138 is connected to a gate of the transistor 137. A negative input of the operation amplifier 138 is connected to a source of the transistor 137. The resistor 136 is connected between the source of the transistor 137 and the ground reference. A gate of the transistor 132, a gate of the transistor 131, a drain of the transistor 132, and a drain of the transistor 137 are tied together. An input terminal of the current source 133 is supplied with the supply voltage $V_{CC}$. An output terminal of the current source 133 is connected to a source of the transistor 132 and to a source of the transistor 131. The resistor 135 is connected from a drain of the transistor 131 to the ground reference.

The sample-voltage $V_{SH}$ and the resistor 136 determine a current $I_{137}$ flowing through the transistor 137. Since the transistor 132 and the transistor 131 build a current mirror, a current $I_{131}$ flowing through the transistor 131 will be proportional to the current $I_{137}$. The amplitude of the current $I_{137}$ can be expressed as:

$$I_{137} = \frac{V_{SH}}{R_{136}}$$

Where $R_{136}$ is the resistance of the resistor 136.

The resistor 135 will convert the current $I_{131}$ to the power-reference voltage $V_{R2}$. Therefore, as the following equation shows, the power-reference voltage $V_{R2}$ will vary in proportion to the sample-voltage $V_{SH}$:

$$V_{R2} = I_{131} \times R_{135} = N \times I_{137} \times R_{135} = N \times \frac{V_{SH}}{R_{136}} \times R_{135} \Rightarrow V_{R2} \propto V_{SH}$$

Where N is the mirror ratio of the current mirror built by transistors 131 and 132.

Figure 9:
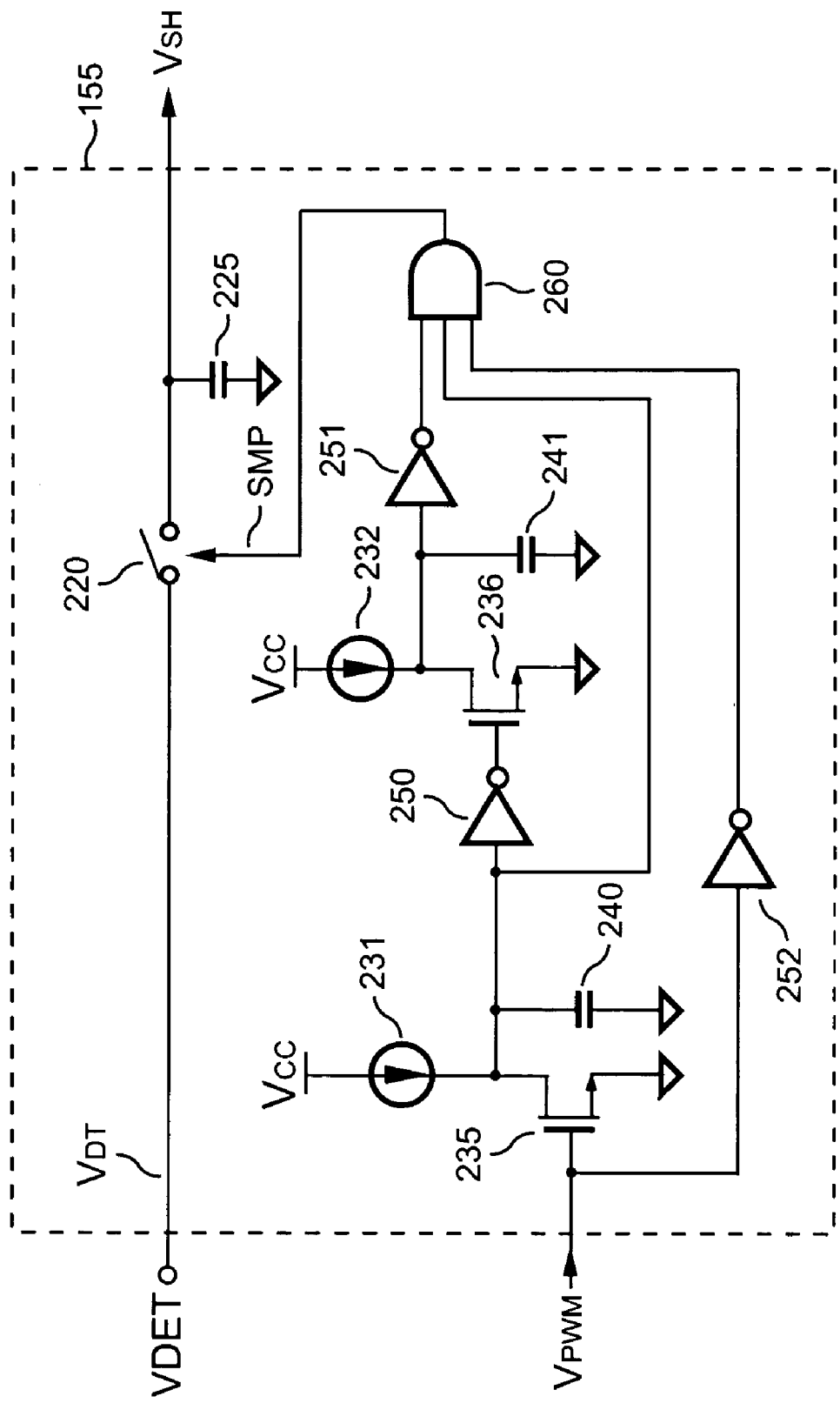
FIG. 9 shows a sample-hold circuit according to a preferred embodiment of the present invention.

FIG. 9 shows the sample-hold circuit 155 according to a preferred embodiment of the present invention. The sample-hold circuit 155 includes a current source 231, a transistor 235, a capacitor 240, an inverter 250, an inverter 252, a current source 232, a transistor 236, a capacitor 241, an inverter 251, an AND gate 260, a switch 220, and a capacitor 225.

A gate of the transistor 235 and an input of the inverter 252 are both supplied with the PWM signal $V_{PWM}$. An input terminal of the current source 231 is supplied with the supply voltage $V_{CC}$. An output terminal of the current source 231 is connected to a drain of the transistor 235. A source of the transistor 235 is connected to the ground reference. The drain of the transistor 235 is connected to an input of the inverter 250. The capacitor 240 is connected from the drain of the transistor 235 to the ground reference. An output of the inverter 250 is connected to a gate of the transistor 236. An input terminal of the current source 232 is supplied with the supply voltage $V_{CC}$. An output terminal of the current source 232 is connected to a drain of the transistor 236. A source of the transistor 236 is connected to the ground reference. The drain of the transistor 236 is connected to an input of the inverter 251. The capacitor 241 is connected from the drain of the transistor 236 to the ground reference. A first input of the AND gate 260 is connected to an output of the inverter 251. A second input of the AND gate 260 is connected to the drain of the transistor 235. A third input of the AND gate 260 is connected to an output of the inverter 252. An output of the AND gate 260 supplies a sample-control signal SMP to a control terminal of the switch 220. An input terminal of the switch 220 is connected to the voltage-detection terminal VDET of the PWM controller 10 for receiving a voltage-detection signal $V_{DT}$. The capacitor 225 is connected from an output terminal of the switch 220 to the ground reference. The sample-voltage $V_{SH}$ is supplied from the output terminal of the switch 220 whenever the control terminal of the switch 220 is enabled by the output of the AND gate 260.

Figure 10:
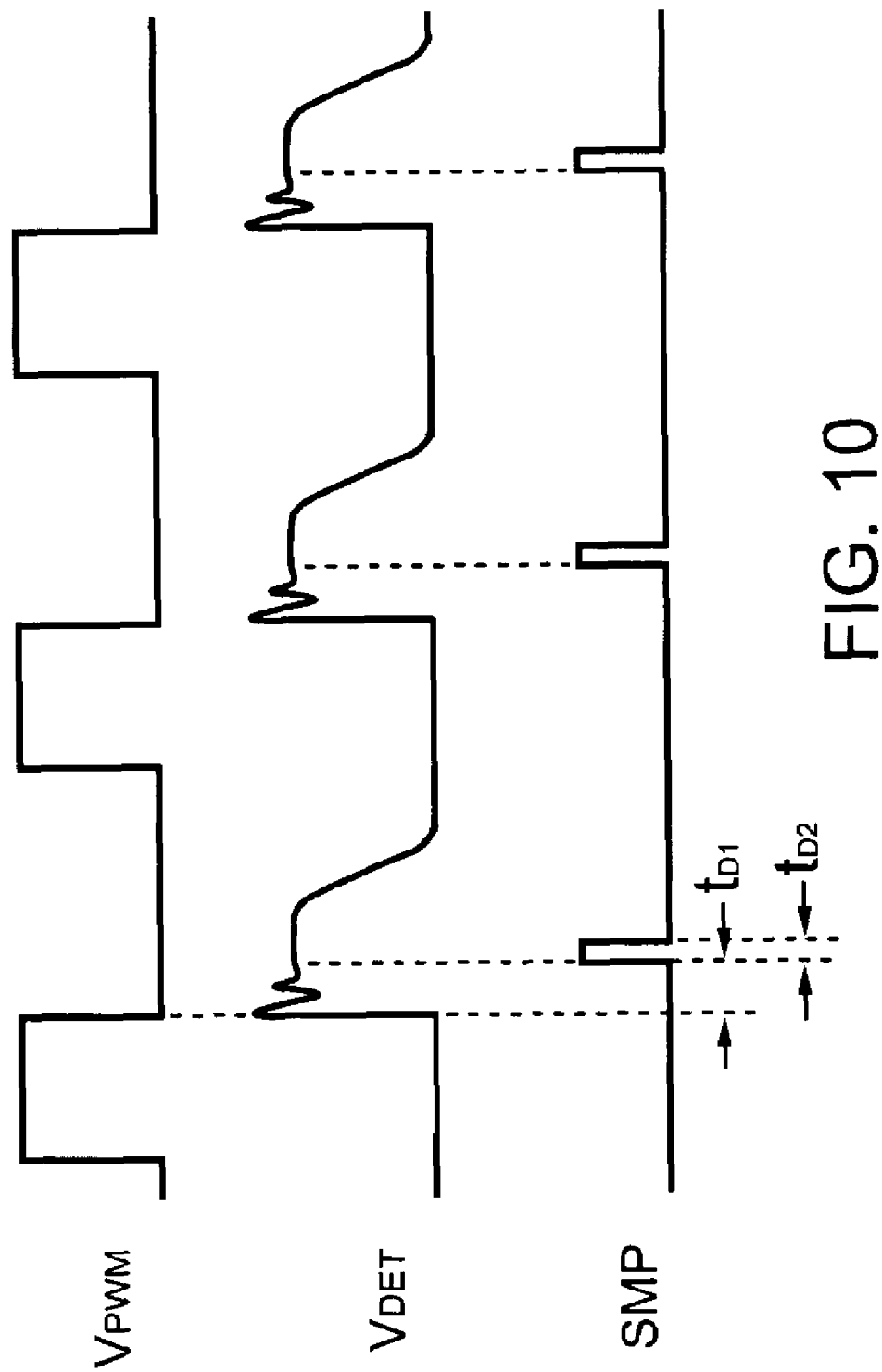
FIG. 10 shows internal signal waveforms of the sample-hold circuit.

FIG. 10 shows the internal signal waveforms of the sample-hold circuit 155. Once the PWM signal $V_{PWM}$ drops to logic-low, as FIG. 9 shows, the transistor 235 will be turned off. The current source 231 will start to charge up the capacitor 240. Before the voltage across the capacitor 240 exceeds the logic-high threshold, the inverter 250 will output a logic-high signal to turn on the transistor 236. This will discharge the capacitor 241 and produce a logic-high signal at the first input of the AND gate 260. The sample-control signal SMP generated from the output of the AND gate 260 will be logic-low. Therefore, the switch 220 will remain open.

Once the voltage across the capacitor 240 exceeds the logic-high threshold, the transistor 236 will be turned off. The sample-control signal SMP generated from the output of the AND gate 260 will become logic-high. This will turn on the switch 220 and enable the voltage-detection signal $V_{DT}$ to charge up the capacitor 225 via the switch 220. Meanwhile, the current source 232 will start to charge up the capacitor 241. Once the voltage across the capacitor 241 exceeds the logic-high threshold, the inverter 251 will supply a logic-low signal to the first input of the AND gate 260. The sample-control signal SMP will then drop to logic-low and turn off the switch 220. The voltage across the capacitor 225 will then be equivalent to the sample-voltage $V_{SH}$.

As FIG. 10 shows, the duration of a delay time $t_{D1}$ is determined by the current source 231 and the capacitor 240. The duration of a delay time $t_{D2}$ is determined by the current source 232 and the capacitor 241.

Figure 11:
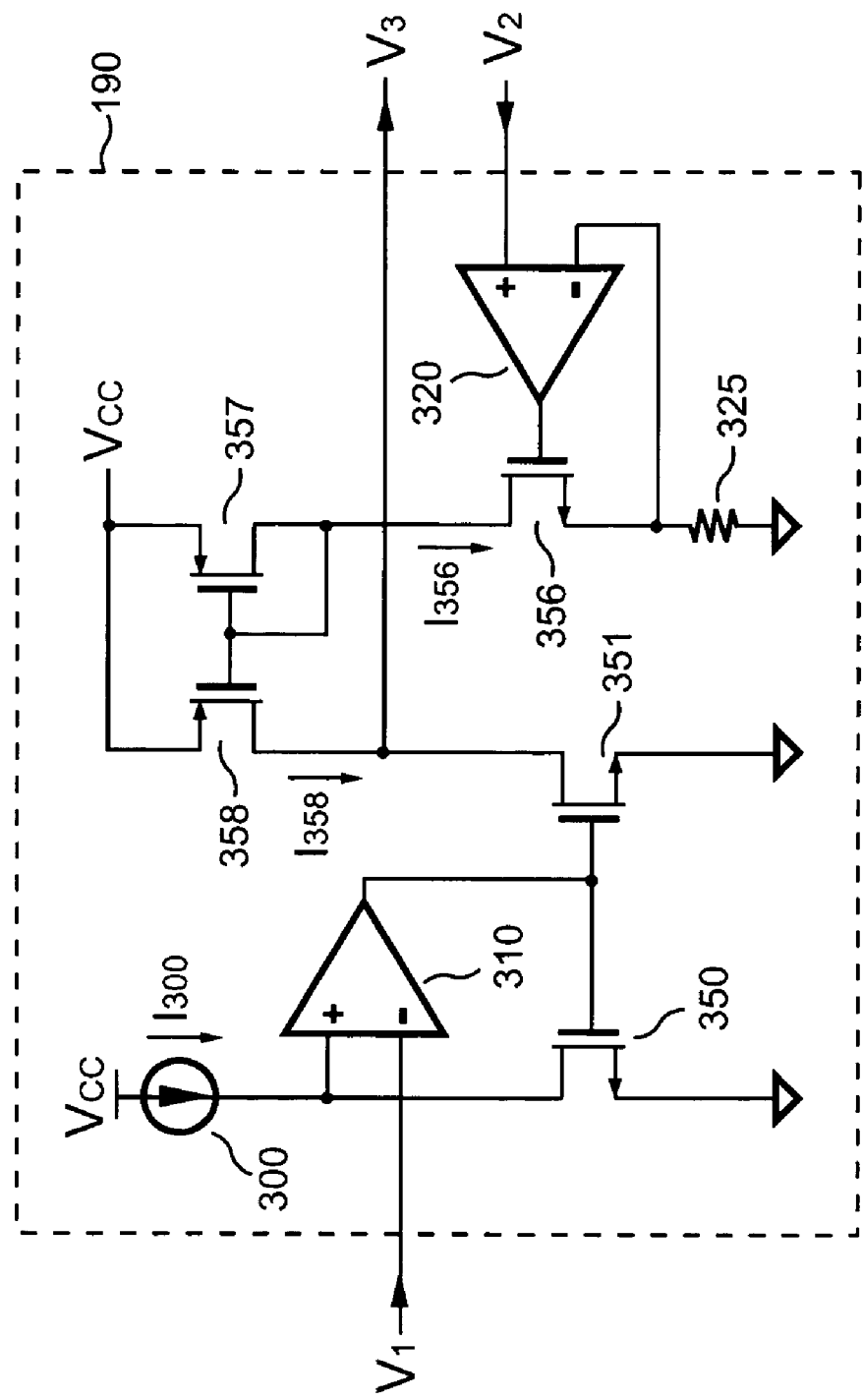
FIG. 11 shows a multiplier according to a preferred embodiment of the present invention.

FIG. 11 shows the multiplier 190 according to a preferred embodiment of the present invention. The multiplier 190 includes a constant current source 300, an operation amplifier 310, five transistors 350, 351, 358, 357 and 356, an operation amplifier 320, and a resistor 325. The multiplier 190 further includes a first input terminal supplied with a voltage $V_1$, a second input terminal supplied with a voltage $V_2$, and an output terminal for generating a voltage $V_3$.

A negative input of the operation amplifier 310 is connected to the first input terminal of the multiplier 190. An input terminal of the constant current source 300 is supplied with the supply voltage $V_{CC}$. An output terminal of the constant current source 300 is connected to a positive input of the operation amplifier 310 and a drain of the transistor 350. A gate of the transistor 350, a gate of the transistor 351, and an output terminal of the operation amplifier 310 are tied together. A source of the transistor 350 and a source of the transistor 351 are both connected to the ground reference. A drain of the transistor 351 and a drain of the transistor 358 are connected to the output terminal of the multiplier 190. A source of the transistor 358 and a source of the transistor 357 are supplied with the supply voltage $V_{CC}$. A gate of the transistor 358, a gate of the transistor 357, a drain of the transistor 357, and a drain of the transistor 356 are tied together. A positive input of the operation amplifier 320 is connected to the second input terminal of the multiplier 190. A negative input of the operation amplifier 320, a source of the transistor 356, and a first terminal of the resistor 325 are tied together. A second terminal of the resistor 325 is connected to the ground reference. An output terminal of the operation amplifier 320 is connected to a gate of the transistor 356.

The transistors 350 and 351 both operate in the linear region. When operating in the linear region, MOS transistors behave as resistors. Modulating the operating voltage and the operating current bias can control the equivalent resistance of the transistor. The operation amplifier 310 controls the resistance of the transistor 350 in response to its operating bias, which is determined by the voltage $V_1$ and a constant current $I_{300}$ that is provided by the constant current source 300. Since the transistor 351 is mirrored from the transistor 350, the resistance $R_{351}$ of the transistor 351 will be the same as the resistance of the transistor 350.

$$R_{351} = \frac{V_1}{I_{300}} \quad (7)$$

The voltage $V_2$ and the resistor 325 determine the amplitude of the current $I_{356}$ flowing through the transistor 356. Since the transistor 358 is mirrored from the transistor 357, a current $I_{358}$ flowing through the transistor 358 will be proportional to the amplitude of the current $I_{356}$ that flows through the transistors 357 and 356.

$$I_{358} \propto I_{356} \Rightarrow I_{358} \propto \frac{V_2}{R_{325}}$$

Where $R_{325}$ is the resistance of the resistor 325.

The current $I_{358}$ and the resistance of the transistor 351 will produce a voltage $V_3$ at the drain of the transistor 351. As the following equation shows, the voltage $V_3$ will be proportional to the product of the voltage $V_1$ and the voltage $V_2$.

$$V_3 = I_{358} \times R_{351} = \frac{V_2}{R_{325}} \times \frac{V_1}{I_{300}} = K_0 \times V_1 \times V_2 \quad (8)$$

Figure 12:
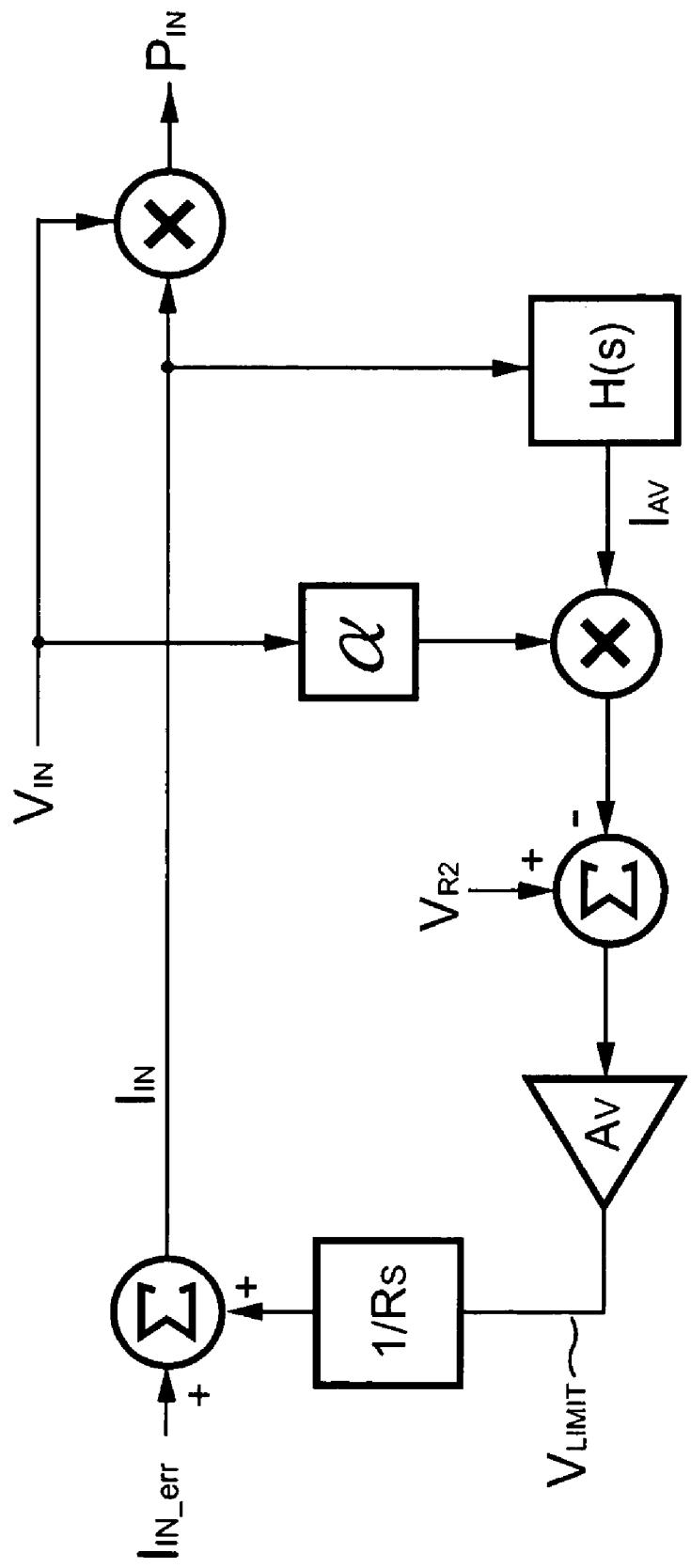
FIG. 12 shows a transfer function block diagram of the power-mode controlled power converter according to the present invention.

FIG. 12 shows the transfer function block diagram of the power-mode controlled power converter. The block H(s) represents the low-pass filter. Av represents the gain of the error amplifier 126. The $I_{IN\text{-}err}$ means the switching current errors caused by the variations of components, the propagation delay time $T_D$ and etc. As shown in FIG. 12, the switching current $I_{IN}$ can be expressed as:

$$I_{IN} = I_{IN\text{-}err} + \frac{V_{LIMIT}}{R_S} \quad (9)$$

$$I_{IN} = I_{IN\text{-}err} + \frac{1}{R_S} \times \{Av \times V_{R2} - Av \times [\alpha \times V_{IN} \times H(s) \times I_{IN}]\} \quad (10)$$

Where $\alpha$ is the attenuation factor of the attenuator 180.

$$I_{IN} = \frac{I_{IN\text{-}err} + \left(Av \times \frac{V_{R2}}{R_s}\right)}{1 + \frac{AV \times \alpha \times H(s) \times V_{IN}}{R_s}} \quad (11)$$

When Av is much greater than 1, and $V_{R2}/R_S$ is greater than $I_{IN\text{-}err}$, the switching current $I_{IN}$ can be rewritten as:

$$I_{IN} = \frac{V_{R2}}{\alpha \times H(s) \times V_{IN}} \quad (12)$$

Therefore, programming the power-reference voltage $V_{R2}$ and the attenuation factor $\alpha$ can precisely control the power delivered from the primary-side circuit to the secondary-side circuit of the power converter, as following equation shows:

$$P_{IN} = V_{IN} \times I_{IN} = \frac{V_{R2}}{\alpha \times H(s)} \quad (13)$$

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power-mode controlled power converter, comprising:
   a transformer, having a secondary winding, a primary winding and an auxiliary winding, wherein said secondary winding of said transformer is connected to a secondary-side circuit of the power-mode controlled power converter and said auxiliary winding of said transformer is connected to a primary-side circuit of the power-mode controlled power converter;
   a power transistor, for energy switching, wherein said power transistor is connected in series with said transformer;
   an output rectifier and an output capacitor;
   an auxiliary rectifier; and
   a PWM controller,
   wherein said PWM controller has a voltage-loop control circuitry coupling to the auxiliary rectifier for generating a voltage-reset signal, a current-loop control circuitry coupling to the power transistor for generating a current-reset signal, a first switch, a second switch, and a circuit for performing pulse width modulation which is started up under control of the first switch and the second switch, to achieve a constant output voltage and a constant output current regulation.

2. The power-mode controlled power convener of claim 1, further comprising a supply terminal connected to a decouple capacitor for receiving a supply voltage; a ground terminal connected to a ground reference level; a voltage-detection terminal coupled to said auxiliary winding of said transformer and said auxiliary rectifier via a detection resistor, a current-detection terminal receiving a switching-current voltage across a sense resistor connected with said power transistor in series; a line-voltage input terminal receiving a line-voltage input signal from an input of the power converter via a line resistor; a filter terminal connected to an integrate capacitor; and an output terminal generating a PWM signal to drive said power transistor.

3. The power-mode controlled power converter of claim 1, wherein said current-loop control circuitry comprises:
   a filter resistor, for providing a high impendence for a low-pass filter, wherein said switching current is converted to an avenge-current across said low-pass filter;

an attenuator, for attenuating said line-voltage input signal to an input-voltage signal, wherein said attenuator is coupled to said line-voltage input terminal via said second switch;

a multiplier, generating a power-control signal by multiplying said average-current signal and said input-voltage signal;

a reference-voltage generator, for generating a power-reference voltage;

a first error amplifier, generating a limit voltage in response to said power-control signal and said power-reference voltage;

a current source;

a resistor, connected with said current source in series, wherein a joint of said resistor and said current source is connected to an output of said first error amplifier, a resistance of said resistor and a current amplitude of said current source determining a maximum amplitude of said limit voltage; and a first comparator, comparing said limit voltage and said switching-current voltage to produce said current-reset signal.

4. The power-mode controlled power converter of claim 1, wherein said voltage-loop control circuitry comprises:

a reference voltage terminal, generating a reference voltage;

a sample-hold circuit, generating a sample voltage, wherein said sample voltage is generated in response to a voltage at said voltage-detection terminal;

a second error amplifier, generating a feedback voltage in response to said sample voltage and said reference voltage;

a second comparator, comparing said feedback voltage and said switching-current voltage to generate said voltage-reset signal; and a programmable current sink, sinking a programmable current in response to said voltage at said voltage-detection terminal.

5. The power-mode controlled power converter of claim 1, wherein said first switch is coupled between said supply terminal of said PWM controller and a joint of said line resistor and said second switch, wherein said first switch is turned off and said second switch is turned on once said PWM controller starts up.

6. The power-mode controlled power converter of claim 2, wherein said line-voltage input terminal of said PWM controller is used to start up said PWM controller and to provide said line-voltage input signal for said current-loop circuitry after said PWM controller starts up.

7. The power-mode controlled power converter of claim 2, wherein said switching-current voltage is converted to an average-current signal across a low-pass filter.

8. The power-mode controlled power converter of claim 2, wherein said current-loop circuitry of said PWM controller regulates said constant output current in response to an average-current signal and said line-voltage input signal.

9. The power-mode controlled power converter of claim 4, wherein an offset voltage is produced across a detection resistor in response to said programmable current, wherein said offset voltage substantially compensates for a voltage drop across said output rectifier.

10. The power-mode controlled power converter of claim 3, wherein said reference-voltage generator comprises:

a first operational amplifier, having a positive input supplied with a sample voltage, said first operational amplifier further having a negative input and an output terminal;

a first resistor;

a first transistor, wherein said first transistor is coupled with said first resistor and said first operational amplifier to generate a first current;

a second transistor;

a third transistor, wherein said second transistor and said third transistor form a first current mirror, said first current mirror generating a second current by mirroring said first current;

a second resistor, converting said second current into said power-reference voltage; and a first current source, for limiting said first current and said second current.

11. The power-mode controlled power converter of claim 4, wherein said sample-hold circuit comprises:

a first capacitor;

a second current source, for charging up said first capacitor;

a fourth transistor, wherein said fourth transistor controls the charging and discharging operation of said first capacitor;

a first inverter, having an input connected to a drain of said fourth transistor;

a second capacitor;

a third current source, for charging said second capacitor;

a fifth transistor, wherein said fifth transistor controls the charging and discharging operation of said second capacitor, wherein a gate of said fifth transistor is connected to an output of said first inverter; and a second inverter, having an input connected to a drain of said fifth transistor.

12. The power-mode controlled power converter of claim 11, said sample-hold circuit further comprising:

a third capacitor;

a third inverter, having an input supplied with said PWM signal;

a third switch, having an input connected to said voltage-detection terminal of said PWM controller, wherein an output of said third switch is connected to said third capacitor to generate said sample voltage; and an AND gate, having a first input connected to an output of said second inverter; a second input connected to said drain of said fourth transistor, a third input connected to an output of said third inverter; said AND gate having an output controlling said third switch.

13. The power-mode controlled power converter of claim 3, wherein said multiplier comprises:

a first multiplier input;

a second multiplier input;

an multiplier output terminal;

a second operational amplifier, having a negative input connected to said first multiplier input;

a constant current source, connected to a positive input of said second operational amplifier, a sixth transistor, wherein a drain of said sixth transistor is connected to said positive input of said second operational amplifier and a source of said sixth transistor is connected to said ground reference level; and a seventh transistor, wherein a gate of said seventh transistor is connected to a gate of said sixth transistor and an output terminal of said second operational amplifier, a source of said seventh transistor being connected to said ground reference level.

14. The power-mode controlled power converter of claim 13, said multiplier further comprising:

an eighth transistor, having a drain connected to a drain of said seventh transistor, wherein said drain of said eighth transistor is further connected to said multiplier output terminal, wherein a source of said eighth transistor is supplied with said supply voltage;

a ninth transistor, having a source supplied with said supply voltage, said ninth transistor having a gate connected to a gate of said eighth transistor and a drain of said ninth transistor;

a third operational amplifier, having a positive input connected to said second multiplier input terminal;

a tenth transistor, having a drain connected to said drain of said ninth transistor, said tenth transistor having a gate connected to an output terminal of said third operational amplifier, said tenth transistor having a source connected to a negative input of said third operational amplifier; and a third resistor, connected from said source of said tenth transistor to said ground reference level.

* * * * *